United States Patent Office 3,634,296
Patented Jan. 11, 1972

3,634,296
METAL ORGANIC COATINGS FOR ANIONIC SUBSTRATES
Robert C. Wade, Ipswich, Mass., assignor to Ventron Corporation, Beverly, Mass.
No Drawing. Continuation-in-part of abandoned applications Ser. No. 630,845, Apr. 14, 1967, and Ser. No. 816,065, Apr. 14, 1969. This application July 14, 1969, Ser. No. 841,540
Int. Cl. C08f 45/24
U.S. Cl. 260—29.6 BM                    6 Claims

ABSTRACT OF THE DISCLOSURE

The invention provides glass articles coated with the complex reaction product of anhydrous trimethyl borate with the anhydrous chloride of a metal selected from Ti (IV), Zr (IV) and Hf (IV). This reaction product is water-soluble but when applied to the surface of glass and dried is substantially water-insoluble. The coated glass surface is delustered and water repellent. This reaction product has a high affinity not only for glass but also for compounds having free hydroxyl groups. Consequently, the glass article may be coated with the complex reaction product, and when dried, may be again coated with a solution or emulsion of a hydroxylic compound and when dried is capable of being dyed with vat dyes or other dyes commonly used for dyeing cellulose fibers.

The invention also provides aqueous solutions of polyvinyl alcohol and the reaction product of anhydrous trimethyl borate and the anhydrous tetrachloride of Ti (IV), Zr (IV) and Hf (IV) which may be used to coat various substrates, such as cotton, glass, leather, paper and starch, which when dried forms an adherent coating on the substrate which may be dyed.

---

This application is a continuation-in-part of my copending application Ser. No. 630,845, filed Apr. 14, 1967, now abandoned. It is also a continuation-in-part of my copending application Ser. No. 816,065, filed Apr. 14, 1969, now abandoned. In the latter application, I have described the preparation of useful products of unknown complex chemical structure which are the reaction products of substantially anhydrous trimethyl borate with a substantially anhydrous tetrachloride of titanium, zirconium or hafnium and contain titanium, zirconium or hafnium together with boron, carbon, hydrogen, chloride and oxygen.

This invention relates to coating anionic substrates, such as cotton, glass, leather, paper and starch, and to solutions or compositions suitable for this purpose.

These complex products are prepared by reacting anhydrous trimethyl borate with an anhydrous tetrachloride of titanium, zirconium or hafnium in an inert anhydrous solvent, such as methylene chloride, chloroform, carbon tetrachloride, or an excess of trimethyl borate. When the evolution of methyl chloride ceases, the reaction is essentially complete. By evaporating the solvent or excess trimethyl borate from the reaction mixture, the solid product is obtained. Elemental analysis indicates that from 1 to about 2 moles of trimethyl borate will react with one mole of the metal chloride. These complex products are believed polymeric and are soluble in water as well as organic solvents, such as methylene chloride, chloroform, carbon tetrachloride, acetone and glycol ethers.

The present invention is based in part upon the discovery that these complex products have a high affinity for all types of glass. When aqueous or non-aqueous solutions of these complex products are applied to the surface of glass and dried, the glass surface is delustered and rendered water repellent. The solution may be applied by dipping the glass article in the solution, or by spraying or padding the solution onto the article. I prefer to employ a reaction product of trimethyl borate with the chloride of the selected metal prepared using about the maximum amount of trimethyl borate.

The present invention is based on part upon the discovery that these complex products not only have a high affinity for all types of glass but also for certain compounds containing free hydroxyl groups. Thus, these complex products may be used to bind hydroxylic compounds to glass surfaces from aqueous or non-aqueous solutions, the glass surface having previously been coated with said complex product. When dried, the normally water-soluble coating materials are rendered substantially water-insoluble on the surface of the glass. Thus, these conplex products serve as a binding agent to bind itself to the hydroxylic compound and to the glass.

The above discoveries have made it possible to coat glass surfaces with these complex products and to coat these surfaces further with compounds containing hydroxyl groups normally soluble in water and rendering the final coated surface substantially water-insoluble. In many cases it is possible to premix aqueous solutions of these complex products together with a solution of hydroxylic compound and a surface active agent and obtain an emulsion which can be applied to the glass surface and dried on to get a coated glass surface equivalent to that obtained in two-stage treatments. The treating and coating operations may be carried out in water solutions where desired and at room temperature or at temperatures up to the boiling point of water. No extreme curing conditions such as long dwell time of the treated substrate at elevated temperature is required. Often, it is sufficient merely to dip the substrate in the water solution or emulsion, remove excess solution or emulsion, and air dry at room temperature, or dry rapidly over a heated drying surface.

The reaction of the hydroxylic coating material with the complex reaction product on the surface of the glass is very fast. Insolubilization of the normally water-soluble hydroxylic compounds takes place as quickly as the water is removed. Thus, it is possible to bind to glass surfaces from water solutions or emulsions, hydroxylic compounds having a molecular weight of at least 72, such as polyvinyl alcohol, polyvinyl acetate hydrolyzed at least 5 percent, copolymers of ethylene and vinyl acetate in which the polyvinyl acetate moiety is at least 5 percent hydrolyzed, terpolymers of vinyl acetate, ethylene and carboxylic acids, such as acrylic or methacrylic acid in which the polyvinyl acetate moiety is at least 5 percent hydrolyzed, starch, dextrin, sodium cellulose xanthate, lignin, glycerine, fatty acid monoglycerides, glycols, and polyurethane latices containing at least 5 percent by weight hydroxyl groups, rendering these materials substantially water-insoluble on the glass. Glass so treated is capable of being dyed with vat dyes or other dyes normally used on cellulose fibers to give full dyeings. Glass so treated can be more easily cemented by adhesives and is protected against abrasion and scratching. Even particulate colloidal materials having free hydroxyl groups, such as partially hydrated colloidal silica, as exemplified by the Philadelphia Quartz Company product Quso H–40 Silica which is 85% $SiO_2$ and the balance water in some bound form as SiOH or water bound by hydrogen banding to the SiOH group or free water may be bound tightly to glass surfaces with these complex products thereby imparting delustering to glass textile materials.

The invention also provides an aqueous solution of polyvinyl alcohol and the complex reaction product of anhydrous trimethyl borate with an anhydrous chloride of a metal selected from Ti(IV), Zr(IV) or Hf(IV)

which may be used to coat various substrates, such as cotton, glass, leather, paper and starch, and which when dried forms a substantially water-insoluble adherent coating on the substrate. A substrate so coated may be dyed with vat dyes or other dye systems commonly used for dyeing cellulosic materials. In forming the aqueous solutions of these complex reaction products with polyvinyl alcohol, equal weight percent of each is preferred. There is no benefit in the use of more than about 1 weight percent of either the complex reaction product or polyvinyl alcohol, 0.5 weight percent each being preferred.

The invention is illustrated further by the following examples.

EXAMPLE 1

A 500 ml., three-neck flask was fitted with a water-cooled reflux condenser which, in turn, was connected to a Dry Ice-acetone cooled condenser and trap; a thermometer and dropping funnel were also fitted to the reaction flask. Stirring was accomplished with a magnetic stirrer.

To the flask was charged 200 g. of redistilled methylene chloride and 69 g. (0.66 mole) of anhydrous B $(OCH_3)_3$. To the dropping funnel was charged 56.7 g. (0.33 mole) of anhydrous $TiCl_4$. The $TiCl_4$ was added to the flask over a period of 5 minutes with the formation of bright yellow solids. The temperature rose from 22 to 45° C. spontaneously. Then, after ten minutes of stirring, $CH_3Cl$ started to evolve, along with a small amount of unidentified volatile material, which fumed in moist air and gave a positive test for boron.

After about 40 minutes, the volution of volatiles ceased and the reaction was essentially complete. The yellow solids had darkened and mostly dissolved.

Methylene chloride was removed by evaporation under vacuum. As the methylene chloride was removed, the product which came out appeared to be polymeric, went through a very viscous liquid phase, then a taffy-like semi-solid stage, and finally hardened into a glassy solid. This could easily be broken up into a light yellow powder. Recovery of solids was 77 g. About 25 g. of volatile products, consisting mainly of $CH_3Cl$ as identified by infrared spectrographic techniques, were recovered.

Elemental analysis of the product showed Ti, 18.5%; B, 6.8%; C, 18.6%; H, 3.8%; Cl, 25.7%; Ti/b ratio: 1/1.6.

EXAMPLE 2

One gram of the product obtained in Example 1 was dissolved in 100 g. of water. A piece of heat-cleaned glass fabric was dipped into this solution, squeezed through a pair of washing machine rolls, and allowed to dry. When dry, marked water repellency had developed when compared with the original untreated fabric. A drop of 30% hydrogen peroxide was placed on the surface of the fabric and an intense yellow color developed. This is characteristic of titanium peroxide and demonstrates that the compound was substantive to the surface of the glass. The treated fabric was then washed for a few seconds in a 1% solution of soap (Na-stearate-oleate). The fabric rinsed and ironed dry. Excellent water repellency was now obtained and the glass fabric still gave a positive test for Ti when treated with hydrogen peroxide.

This shows that the new compositions of my inventions are useful for treating glass surfaces to develop water repellency and may be applied from aqueous or non-aqueous media.

EXAMPLE 3

A 1% solution of the product obtained in Example 1 was prepared in water. A sample of heat-cleaned glass fabric was immersed in this solution for 10–15 seconds, then squeezed through pad rolls to about 100% solution pick-up. The glass cloth was then immediately immersed in a 1% aqueous solution of polyvinyl alcohol, "Elvanol 72–60" (Trademark, E. I. du Pont de Nemours, Electrochemicals Department) and again passed through rollers to give about 100% solution pick-up. The fabric was then ironed dry with a hand iron set for synthetic fabrics. This took about 15–30 seconds. The fabric was then rinsed with plain water and placed in a reduced vat dye bath containing 8 g. liter of Brilliant Green B, plus sufficient sodium hydroxide and sodium hydrosulfite to keep the dye reduced. Dyeing took place at 80–140° F. for 5 minutes. The fabric was removed, the dry air oxidized, the fabric was washed in warm running water, and then washed in a 1% soap solution for 10 minutes at 90° F. An excellent deep dyeing was obtained.

EXAMPLE 4

A sample of glass fabric treated only with the titanium-boron complex of the first step in Example 3 was also dyed in the same bath as used in Example 3. Only a light dyeing of the fabric occurred, showing that this treatment alone is not sufficient to produce a heavy dyeing.

EXAMPLE 5

A sample of cloth treated only with 1% polyvinyl alcohol as in Example 3 was dyed. While a fairly good dyeing was noted when the fabric was removed from the dye bath and oxidized, almost all of the color was removed in the rinsing and soaping operation showing the polyvinyl alcohol was not firmly bound or insolubilized on the glass surface.

EXAMPLE 6

Other heat-cleaned glass surfaces, such as glass rods and microscope slides, were treated by dipping them into a 1% aqueous solution of the complex product of Example 1, allowing them to dry. When immersed in a reduced vat dye bath, these surfaces were dyed to a surprising depth of color. When the dye was oxidized and the surface dipped into a 1% soap solution, the dyed surface remained on the glass article and developed good water repellency as well.

This demonstrates that this process is useful for decorating glass objects such as bottles, jars, and the like.

EXAMPLE 7

Heat-cleaned glass fabric was treated with 0.1 to 1% aqueous solution of the complex material obtained in Example 1, immediately followed by treatments in solutions containing 0.1–1% of sodium cellulose xanthate solution. After the second treatment, the fabric was ironed dry or allowed to dry at room temperature. The fabric was then vat dyed. In every case, an improved vat dyeing was obtained on the fabric which was far deeper and more permanent than on a control sample which did not receive the first treatment with the complex compound of Example 1.

Similar results were obtained by replacing the sodium cellulose xanthate by starch, glycerine, dextrin, 5 percent hydrolyzed polyvinyl acetate, polyurethane latices, dispersions of copolymers of polyvinyl acetate and ethylene, known as Elvax PB 3–040, PB 3–150, PB 3–260 (TM E. I. duPont), dispersions of terpolymers of vinyl acetate, ethylene and acrylic or methacrylic acid in which the polyvinyl acetate moiety was 85% hydrolyzed and known as Elvax PB 3–700 and PB 3–703 (TM E. I. duPont).

EXAMPLE 8

A sample of heat-cleaned fabric was treated in 100 ml. of an aqueous medium in which was dissolved 1 g. of the complex compound of Example 1, and in which was suspended 1 g. of colloidal silica, "Quso H–40" (Trademark, Philadelphia Quartz Co.). According to the manufacturer, this silica contains a substantial amount (5% by weight) of Si—OH bonds. After dipping the glass fabric into this solution-suspension, the cloth was squeezed to about 100% pick-up through a set of rollers. Part of the fabric was then dipped into a 1% solution of soap in water, and squeezed to 100% pick-up. All samples were then quickly ironed dry with a home iron set for medium heat.

A very marked delustering of all samples was obtained. The sample which had been finally dipped into the soap solution developed good water repellency. The other sample not treated with soap was very hydrophilic. All samples could be rinsed in plain water without any change in the delustered finish. This shows that particulate materials containing free hydroxyl groups may be tightly bound to glass surfaces by this process.

EXAMPLE 9

Using the same apparatus described in Example 1, the following experiment was carried out using $ZrCl_4$ in place of $TiCl_4$.

To the reaction flask was charged 200 g. of dry $CH_2Cl_2$ and 62.5 g. or 0.27 mole of $ZrCl_4$. This slurry was stirred with a magnetic stirrer. Then, from a dropping funnel was added 104 g. or 1 mole of pure methyl borate. With the initial addition of methyl borate, heat was evolved and when about half of the methyl borate had been added, the temperature had increased from 24 to 38° C. After about half of the methyl borate was added, methyl chloride started to evolve and was condensed out in the Dry Ice condenser. After all of the methyl borate was added, the reaction mixture was refluxed for 30 minutes to complete the reaction. Then the methylene chloride and excess methyl borate were distilled off and the remaining liquids removed by heating under vacuum overnight. There was recovered about 96 g. of white solids. Elemental analysis of this product showed: Zr, 25.6%; B, 4.7%; C, 17.1%; H, 4.0%; Cl, 31.0%. The low-boiling material collected in the Dry Ice trap was identified mainly as methyl chloride by infrared spectrographic analysis.

EXAMPLE 10

Heat-cleaned glass fabric was immersed for 5 seconds in a 1% aqueous solution of the complex product obtained in Example 9 and then squeezed through pad rolls to about 100% solution pick-up. The fabric was then immersed for 5 seconds in a 1% aqueous solution of "Elvanol 72-60" (Trademark, E. I. duPont) polyvinyl alcohol, and again squeezed to 100% pick-up. The fabric was ironed dry with a hand iron set for medium heat. The fabric was rinsed with warm running water and then immersed in a reduced vat dye bath of Brilliant Green B, a jade green vat dye. Dyeing was allowed to take place for 1 minute at 120° F. the cloth was removed, the dye air oxidized, the sample rinsed in running water for a few seconds, then washed in a 1% soap solution for 10 minutes at 70° F. An excellent deep dyeing was obtained. The dye was not removed by the water rinsing or soaping operation. A good degree of water repellency also developed as part of this treatment.

EXAMPLE 11

A piece of heat-cleaned glass fabric was dipped into a 1% aqueous solution of the complex compounds obtained in Example 1 and squeezed to about 100% by weight of fabric pick-up of solution. The fabric was then dipped into a 1% aqueous solution of polyvinyl alcohol, "Elvanol 72–60" (Trademark, E. I. duPont) which also contained a blue phthalocyanine pigment, "Aridye Padd Blue 2–G" (Trademark, Interchemical Corp.) in a concentration of 50 g. per liter. It was again squeezed to about 100% pick-up and dried in air at room temperature until just slightly damp. The fabric sample was then completely dried by ironing with a hand iron set for medium heat. The fabric was then washed for 20 minutes in a ¼% aqueous soap solution at 120–135° F. It was then rinsed in warm water and dried. An excellent dyeing was obtained which remained fixed to the fabric throughout all of the treatment described in this experiment.

EXAMPLE 12

Heat-cleaned glass fabric was immersed for five seconds in a 1% aqueous solution of the complex compound obtained in Example 1, and squeezed through nip rolls to about 100% pick-up of solution. The fabric was then dipped into a 1% aqueous solution of commercial lignin, "Indulin AT" (Trademark, West Virginia Pulp & Paper Co.). This solution contained sufficient NaOH to dissolve the lignin and give a pH of about 10–11. The fabric was then squeezed again and ironed dry. A light brown color remained on the fabric which was not removed by washing with water or with 1% soap solution. Rubber cement showed very high adherence to this lignin-coated glass fabric. This glass fabric showed improved dyeing with a vat dye over the untreated fabric.

EXAMPLE 13

2.5 grams of polyvinyl alcohol, "Elvanol 72–60" (Trademark, DuPont) and 7.5 g. of sodium oleate soap flakes were dissolved in 400 ml. of water. Separately, 10 grams of the complex compound obtained in Example 1 was dissolved in 200 ml. of water. This latter solution was added with vigorous mixing to the former solution, together with enough additional water to make the total volume 1 liter. The white milky suspension now contained 1% of the complex compound of Example 1, ¾% of sodium oleate, and ¼% of polyvinyl alcohol.

Heat-cleaned glass fabric was padded with this dispersion and squeezed to about 100% suspension pick-up based on the weight of dry fabric. The fabric was ironed dry. The fabric became water repellent, was well dyed with a vat dye, and the dyed coating was not removed by boiling in 1% soap solution. Furthermore, the fabric was markedly delustered by the treatment prior to dyeing, and gummed labels stuck well to its surface.

EXAMPLE 14

(a) Freshly molded glass bottles which were annealed in a lehr and cooled to about 140–150° F. were first steamed for 5 seconds with 40 lbs./sq. in. steam, then sprayed with an aqueous solution containing ½% of the complex compound of Example 1, and then sprayed with an oxidized polyethylene emulsion containing about 1% solids. When the bottles were dry, their surfaces were found to be highly lubricated as measured by the sliding table, had excellent scratch resistance, were very water repellent, had good appearance, and had 100% label adherence with both casein and dextrine label adhesives. The lubricity and scratch resistance tests were those described in Technical Bulletin No. 64, "Methods for Testing Lubricity and Scratch Resistance of Coated Glass Containers," by the Advisory Sub-Committee on Test Levels and Methods Committee on Testing Procedures, 5-Glass Container Manufacturers Institute. Using these tests, the dry slip angle was 14°, the wet slip angle 24°, dry scratch load of 40 lbs., wet scratch load of 45 lbs.

(b) Another group of bottles treated as above, but given a 5-second exposure to steam after applying the polyethylene emulsion coating showed a dry slip angle of 12.60°, wet slip angle of 24°, dry scratch load of 52 lbs., wet scratch load of 40 lbs., good appearance, 100% labeling and excellent water repellency.

(c) Freshly molded and annealed glass bottles with pristine surfaces at 140–160° F. were presteamed, then sprayed with an aqueous solution containing 0.5% of the complex compound of Example 1. They were then sprayed with a solution containing 1 oz./gal. of green soap and ½% polyvinyl alcohol. When dry, tests showed dry slip angle of 12°, wet slip angle of 15°, dry scratch load of 45 lbs., wet scratch load of 60 lbs., fogged scratch load of 35 lbs., 100% label adherence, and almost no water repellency.

(d) Bottles prepared as in part (c) of this example were presteamed, sprayed with 0.5% aqueous solution of the complex compound of Example 1 and then with a solution containing 1 oz./gal. of polyethylene emulsion and ½% polyvinyl alcohol. When dry, the bottles were tested with the following results: Dry slip angle=12°, wet slip angle=11°, dry scratch load=70 lbs., wet scratch load=80 lbs., fogged scratch load=55 lbs., and satisfactory labeling.

(e) An aqueous mixture was prepared which contained ½% of the complex compound of Example 1 and ½% (based on weight of solids) of an emulsion of a terpolymer of polyvinyl acetate-polyethylene and an acrylic or methacrylic acid, "Elvax PB 3–700" (Trademark, E. I. duPont, Electrochemicals Department). This solution was sprayed directly onto pristine bottles at 140–160° F. with no prestreaming at an application level of about $5 \times 10^{-6}$ oz. per square inch of surface area. When the bottles were dry, they were tested as before. Tests showed: Dry slip angle=15°, wet slip angle=17°, dry scratch load=76 lbs., wet scratch load=80 lbs., medium water repellency and satisfactory labeling characteristics.

EXAMPLE 15

A 2% aqueous solution of the product produced in Example 1 was prepared. One part by volume of the solution was carefully added with stirring to an equal volume of 2% aqueous solution of polyvinyl alcohol (Elvanol 72–60 TM E. I. duPont). The viscosity of the resulting solution increased but no precipitation or gelation occurred. pH of solution was about 1. Heat-cleaned fibreglass fabric was dipped in this solution and squeezed to 100% pick-up based on dry weight of fabric. The fabric was dried in an air oven at 220° C. for 15 minutes. The coated fabric was boiled for 30 minutes in distilled water. The fabric was then dyed with a reduced vat dye in an alkaline solution at 140–160° F. for 5 minutes. The dye was then oxidized. An excellent dyeing of the fabric was obtained. This fabric was boiled for another 30 minutes in a 1% soap solution. Almost no dye was lost.

A similar experiment was carried out where the glass fabric was coated only with the 1% polyvinyl alcohol solution, dried, and boiled in distilled water for 30 minutes. When this was vat dyed only a weak dyeing was obtained indicating that only a small amount of polyvinyl alcohol remained on the fabric. Further boiling of the dyed fabric in a 1% soap solution for 30 minutes removed most of the remaining polyvinyl alcohol and dye.

I claim:
1. An aqueous solution comprising about 1 weight percent of a reaction product of anhydrous trimethyl borate and an anhydrous chloride of a metal selected from the group consisting of Ti(IV), Zr(IV) and Hf(IV), and about 1 weight percent of polyvinyl alcohol.
2. An aqueous solution as claimed by claim 1 wherein said reaction product is that of trimethyl borate and titanium tetrachloride.
3. An aqueous solution comprising not more than about 0.5 weight percent of the reaction product of anhydrous trimethyl borate and an anhydrous chloride of a metal selected from the group consisting of Ti(IV), Zr(IV) and Hf(IV) and not more than about 0.5 weight percent of polyvinyl alcohol.
4. An aqueous solution as claimed by claim 3 wherein said reaction product is that of trimethyl borate and titanium tetrachloride.
5. An aqueous solution as claimed by claim 3 wherein said reaction product is that of trimethyl borate and zirconium tetrachloride.
6. An aqueous solution as claimed by claim 3 wherein said reaction product is that of trimethyl borate and hafnium tetrachloride.

References Cited

UNITED STATES PATENTS

| 3,296,242 | 1/1967 | Turner et al. | 260—429.3 X |
| 3,455,976 | 7/1969 | Wade | 260—429.3 |

ALFRED L. LEAVITT, Primary Examiner

W. F. CYRON, Assistant Examiner

U.S. Cl. X.R.

117—124 E